US012658534B2

(12) United States Patent
Park et al.

(10) Patent No.: US 12,658,534 B2
(45) Date of Patent: Jun. 16, 2026

(54) WELDING METHOD AND ELECTRODE ASSEMBLY MANUFACTURED BY THE SAME

(71) Applicant: LG Energy Solution, Ltd., Seoul (KR)

(72) Inventors: Jung Hyun Park, Daejeon (KR); Tae Su Kim, Daejeon (KR); Dong Hyeuk Park, Daejeon (KR); Seo Jun Lee, Daejeon (KR); Gil Woo Kim, Daejeon (KR); Hyuk Soo Lee, Daejeon (KR); Ki Beom Na, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 737 days.

(21) Appl. No.: 18/108,083

(22) Filed: Feb. 10, 2023

(65) Prior Publication Data

US 2023/0261336 A1     Aug. 17, 2023

(30) Foreign Application Priority Data

Feb. 15, 2022     (KR) ........................ 10-2022-0019795

(51) Int. Cl.
| | |
|---|---|
| *H01M 50/536* | (2021.01) |
| *B23K 26/22* | (2006.01) |
| *H01M 50/54* | (2021.01) |

(52) U.S. Cl.
CPC ........... *H01M 50/536* (2021.01); *B23K 26/22* (2013.01); *H01M 50/54* (2021.01)

(58) Field of Classification Search
CPC .. H01M 50/536; H01M 50/54; H01M 50/169; H01M 50/516; H01M 50/105; B23K 26/22; B23K 2101/38; Y02E 60/10
See application file for complete search history.

(56) References Cited

U.S. PATENT DOCUMENTS

| | | | |
|---|---|---|---|
| 2001/0012583 A1 | 8/2001 | Barber et al. |
| 2015/0056506 A1 | 2/2015 | Lilley et al. |
| 2016/0260952 A1 | 9/2016 | Park et al. |
| 2017/0141374 A1 | 5/2017 | Nakai |
| 2021/0135321 A1 | 5/2021 | Chen |

FOREIGN PATENT DOCUMENTS

| | | |
|---|---|---|
| CN | 209786103 U | 12/2019 |
| CN | 112332037 A | 2/2021 |
| CN | 113488745 A | 10/2021 |
| CN | 214518389 U | 10/2021 |
| JP | 2001-512891 A | 8/2001 |
| JP | 2008-262918 A | 10/2008 |

(Continued)

*Primary Examiner* — Robert G Bachner
(74) *Attorney, Agent, or Firm* — Lerner David LLP

(57) ABSTRACT

A welding method includes pressing multiple objects together by a jig and irradiating the objects with laser to form multiple welded spots. The welded spots may include multiple first welded spots formed in a first direction and multiple second welded spots formed in the first direction and misaligned with the first welded spots in a second direction which is perpendicular to the first direction. A gap between the center of each of the first welded spots and the center of each of the second welded spots in the second direction. Another gap between the first welded spots in the first direction. And a gap between the second welded spots in the first direction may be greater than or equal to the radius of the second welded spot and less than or equal to a value of about 1 mm plus a diameter of the second welded spot.

10 Claims, 6 Drawing Sheets

(56)        References Cited

FOREIGN PATENT DOCUMENTS

| | | | |
|---|---|---|---|
| JP | 2011-054319 | A | 3/2011 |
| JP | 6965587 | B2 | 11/2021 |
| KR | 2014-0113646 | A | 9/2014 |
| KR | 20160107643 | A | 9/2016 |
| KR | 2017-0012340 | A | 2/2017 |
| KR | 2017-0016540 | A | 2/2017 |
| KR | 2017-0101857 | A | 9/2017 |
| KR | 2018-0044726 | A | 5/2018 |
| KR | 2021-0062707 | A | 5/2021 |

WELDING METHOD AND ELECTRODE ASSEMBLY MANUFACTURED BY THE SAME

CROSS-REFERENCE TO RELATED APPLICATIONS

This application claims the priority of Korean Patent Application No. 10-2022-0019795 filed on Feb. 15, 2022, in the Korean Intellectual Property Office, the disclosure of which is incorporated herein by reference.

BACKGROUND OF THE INVENTION

Field of the Invention

The present invention relates to a welding method using laser, and an electrode assembly manufactured by the welding method.

Description of the Related Art

Recently, as prices of energy sources rise due to depletion of fossil fuels and interests about environmental pollution are amplified, a need for eco-friendly alternative energy sources is indispensable for life in the future. Accordingly, research continues on various power generation technologies using sunlight, wind power, tidal power, and so on, and there is also a continuing great interest in power storage systems, such as batteries, for more efficiently using electrical energy generated through the technologies.

Moreover, as the technical development of and a demand for mobile electronic devices and electric vehicles using batteries increase, a demand for batteries as energy sources rapidly increases. Accordingly, much research is conducted on batteries that can meet the various needs.

In particular, lithium secondary batteries such as lithium-ion batteries and lithium-ion polymer batteries, which have advantages such as high energy density, discharge voltage, and output stability, are in high demand in terms of materials.

An electrode assembly of the secondary batteries may include a plurality of electrodes stacked with a separator therebetween. Thus, manufacturing of the secondary batteries may include a pre-welding process of welding a plurality of electrode tabs, which are connected to the plurality of electrodes, to each other, and a main-welding process of welding an electrode lead to the plurality of electrode tabs welded to each other.

The pre-welding and/or the main-welding may be performed by laser welding. A welding device that performs the laser welding may weld an object to be welded with laser in a state in which a mask jig is in close contact with and fixes the object, and the welding is performed while the laser forms a plurality of welded spots that form a predetermined pattern.

According to the related art, a plurality of welded spots S on an object T are generally formed to have a predetermined matrix shape as illustrated in FIG. 1. Accordingly, a weld portion is difficult to reduce, and welding quality is deteriorated.

SUMMARY OF THE INVENTION

An aspect of the present invention provides a welding method capable of reducing a weld portion of an object and improving welding quality, and an electrode assembly manufactured by the welding method.

According to an aspect of the present invention, there is provided a welding method including pressing a plurality of objects to be in close contact with each other by a jig, and irradiating the plurality of objects with laser to form a plurality of welded spots. The plurality of welded spots may include a plurality of first welded spots formed in a first direction, and a plurality of second welded spots formed in the first direction and misaligned with the plurality of first welded spots in a second direction perpendicularly crossing the first direction. A gap between a center of each of the first welded spots and a center of each of the second welded spots in the second direction may be greater than or equal to a radius of the first welded spot and a radius of the second welded spot. A gap between the plurality of first welded spots in the first direction may be greater than or equal to the radius of the first welded spot and less than or equal to a value of about 1 mm plus a diameter of the first welded spot. A gap between the plurality of second welded spots in the first direction may be greater than or equal to the radius of the second welded spot and less than or equal to a value of about 1 mm plus a diameter of the second welded spot.

The plurality of first welded spots and the plurality of second welded spots may be formed apart from each other.

The plurality of first welded spots and the plurality of second welded spots are formed to be alternately disposed in the first direction.

The second welded spot may be formed to partially overlap the first welded spot in the first direction.

The gap between the center of the first welded spot and the center of the second welded spot in the second direction may be less than or equal to a value of about 1 mm plus a sum of the radius of the first welded spot and the radius of the second welded spot.

According to another aspect of the present invention, there is provided an electrode assembly including a plurality of electrodes stacked with a separator therebetween, and a plurality of electrode tabs connected to the plurality of electrodes and welded to each other. Each of the electrode tabs may include a plurality of first welded spots formed in a first direction, and a plurality of second welded spots formed in the first direction and misaligned with the plurality of first welded spots in a second direction perpendicularly crossing the first direction. A gap between a center of each of the first welded spots and a center of each of the second welded spots in the second direction may be greater than or equal to a radius of the first welded spot and a radius of the second welded spot. A gap between the plurality of first welded spots in the first direction may be greater than or equal to the radius of the first welded spot and less than or equal to a value of about 1 mm plus a diameter of the first welded spot. A gap between the plurality of second welded spots in the first direction may be greater than or equal to the radius of the second welded spot and less than or equal to a value of about 1 mm plus a diameter of the second welded spot.

According to another aspect of the present invention, there is provided an electrode assembly including a plurality of electrodes stacked with a separator therebetween, a plurality of electrode tabs connected to the plurality of electrodes and welded to each other, and an electrode lead welded to the plurality of electrode tabs. The electrode lead may include a plurality of first welded spots formed in a first direction, and a plurality of second welded spots formed in a first direction and misaligned with the plurality of first welded spots in a second direction perpendicularly crossing the first direction. A gap between a center of each of the first welded spots and a center of each of the second welded spots in the second direction may be greater than or equal to a radius of the first welded spot and a radius of the second welded spot. A gap between the plurality of first welded spots in the first direction may be greater than or equal to the radius of the first welded spot and less than or equal to a value of about 1 mm plus a diameter of the first welded spot. A gap between the plurality of second welded spots in the first direction may be greater than or equal to the radius of the second welded spot and less than or equal to a value of about 1 mm plus a diameter of the second welded spot.

The plurality of first welded spots and the plurality of second welded spots may be spaced apart from each other.

The plurality of first welded spots and the plurality of second welded spots may be alternately disposed in the first direction.

The second welded spot may partially overlap the first welded spot in the first direction.

The gap between the center of the first welded spot and the center of the second welded spot in the second direction may be less than or equal to a value of about 1 mm plus a sum of the radius of the first welded spot and the radius of the second welded spot.

BRIEF DESCRIPTION OF THE DRAWINGS

The following drawings attached in this specification illustrate a preferred embodiment of the present invention and function to make further understood the technical spirit of the present invention along with the detailed description of the invention. The present invention should not be construed as being limited to only the drawings. In the drawings.

DETAILED DESCRIPTION

Figure 1:
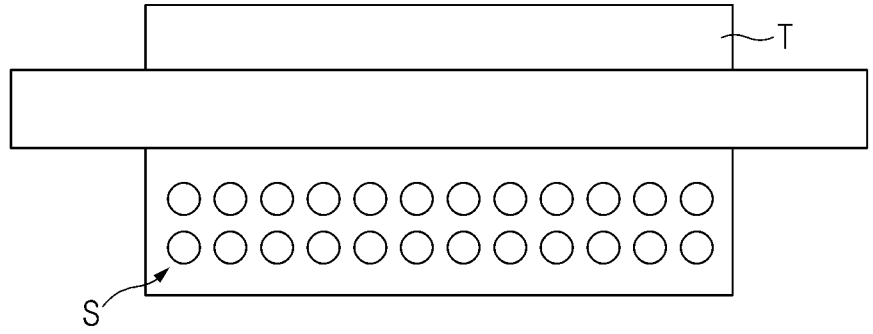
FIG. 1 is a view illustrating a plurality of welded spots formed by a welding method according to the related art.

Hereinafter, embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be ruled out in order to clearly describe the present invention. Like reference numerals refer to like elements throughout the whole specification.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Figure 2:
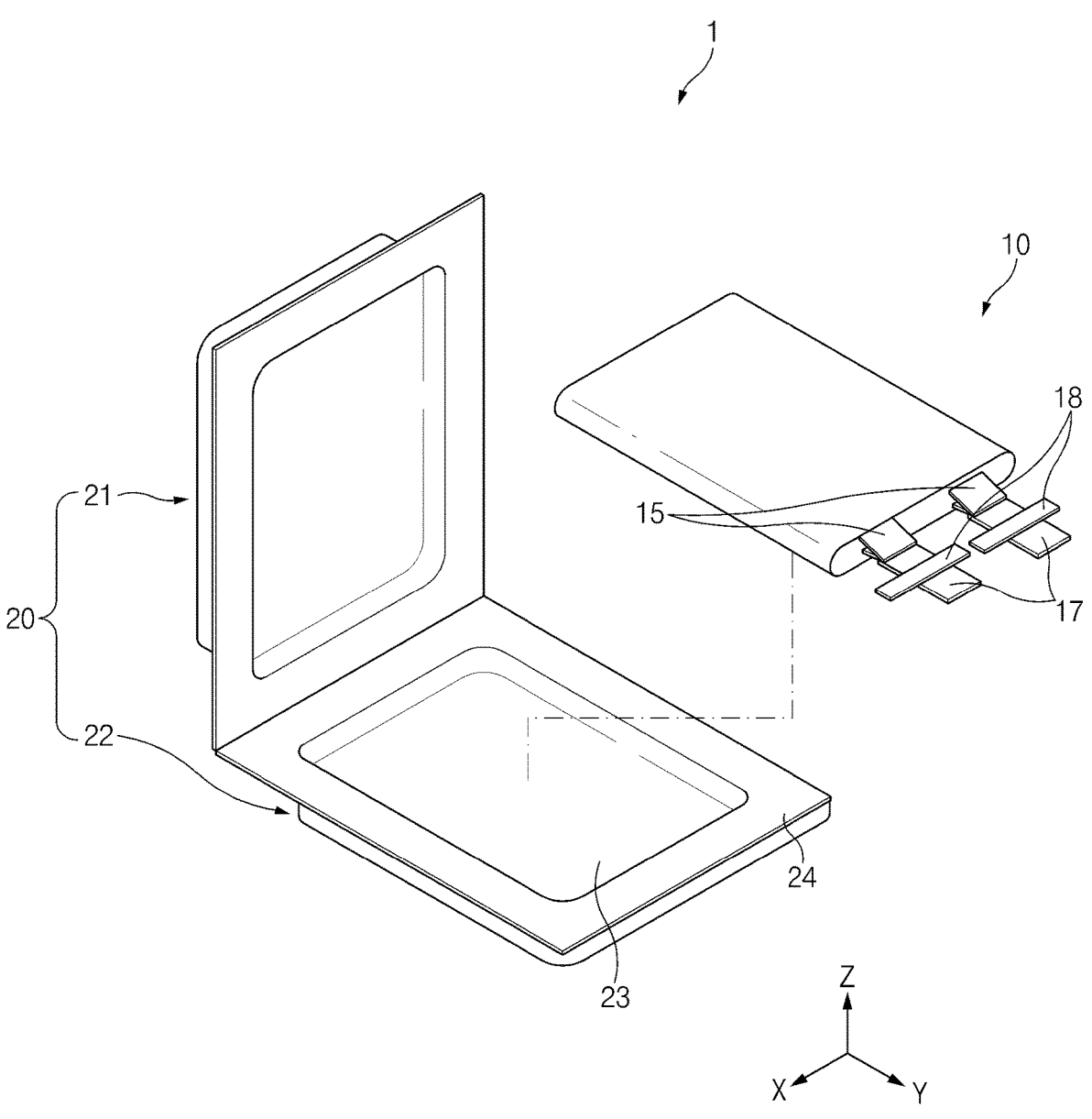
FIG. 2 is an exploded perspective view of an electrode assembly and a pouch type battery case that accommodates the electrode assembly according to an embodiment of the present invention.
Figure 3:
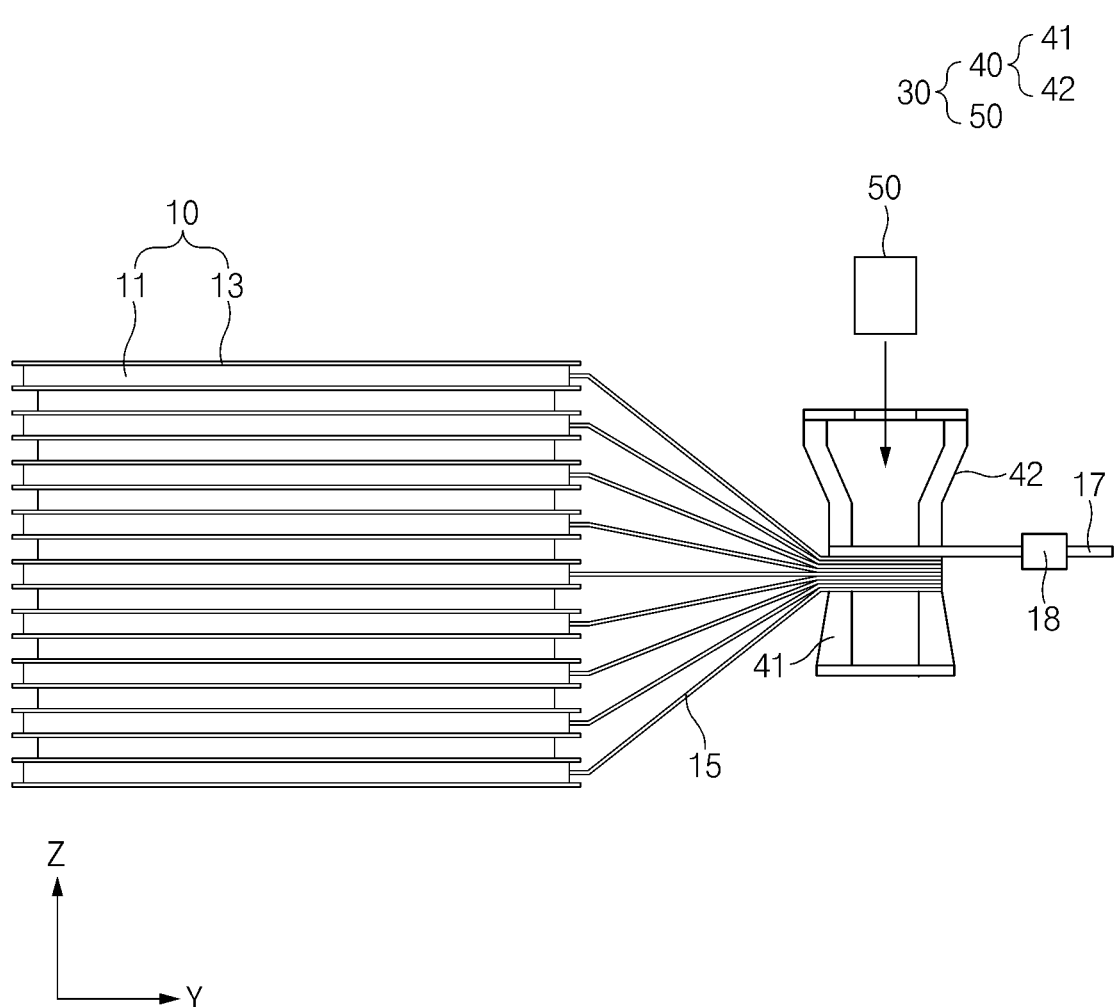
FIG. 3 is a schematic view of a laser welding device acting on an electrode assembly according to an embodiment of the present invention.

FIG. 2 is an exploded perspective view of an electrode assembly and a pouch type battery case that accommodates the electrode assembly according to an embodiment of the present invention. FIG. 3 is a schematic view of a laser welding device acting on an electrode assembly according to an embodiment of the present invention.

An electrode assembly 10 according to an embodiment of the present invention may be accommodated in a pouch type battery case 20 (hereinafter referred to as the case). The case may be sealed in a state, in which the case 20 accommodates the electrode assembly 10 together with an electrolyte, and constitute a pouch type secondary battery.

The electrode assembly 10 may include a plurality of electrodes 11 stacked with a separator 13 therebetween, and a plurality of electrode tabs 15 connected to the plurality of electrodes 11 and welded to each other. The electrode assembly may further include an electrode lead 17 welded to the plurality of electrode tabs 15.

Each of the electrodes 11 may be made by applying active material slurry to an electrode collector having a shape of a metal foil or metal mesh. The plurality of electrodes 11 may include a positive electrode and a negative electrode, and the separator 13 may insulate the positive electrode and the negative electrode from each other. In the positive electrode, the electrode collector may include an aluminum material. In the negative electrode, the electrode collector may include a copper material. The electrode assembly 10 is a power generation device in which the positive electrode and the negative electrode are stacked in sequence with the separator 13 interposed therebetween, and may have a stack type structure or a stack and folding type structure.

The plurality of electrode tabs 15 may be connected to the plurality of electrodes 11 and welded to each other. The plurality of electrode tabs 15 may be welded to each other by welding such as ultrasonic welding or laser welding.

In more detail, the plurality of positive electrode tabs connected to the plurality of positive electrodes may be welded to each other, and the plurality of negative electrode tabs connected to the plurality of negative electrodes may be welded to each other.

Although FIG. 3 illustrates only the negative electrode tabs for convenience of explanation, it could be easily understood by those skilled in the art that the positive electrode tabs may be also welded in the same manner as the negative electrode tabs.

The electrode lead 17 may be connected to the electrode tabs 15. The electrode lead 17 may be welded to the plurality of electrode tabs 15 by welding such as laser welding. The electrode lead 17 may be welded to overlap a weld portion at which the plurality of electrode tabs 15 are welded to each other.

The electrode lead 17 connected to the positive electrode tabs and the electrode lead 17 connected to the negative electrode tabs may extend in the same direction or may extend opposite directions according to positions at which the positive electrode tabs and the negative electrode tabs are formed, respectively.

In a state in which the electrode assembly 10 is sealed in the case 20, a portion of the electrode lead 17 may protrude to the outside of the case 20, or may be electrically connected to an external terminal (e.g., a busbar). The electrode lead 17 may function as a current path, together with the electrode tabs 15, for the electrode assembly 10 sealed in the case 20.

The pair of electrode leads 17 connected to the positive electrode tabs and the negative electrode tabs, respectively, may have different materials. For example, the electrode lead 17 connected to the positive electrode tabs may be made of an aluminum (Al) material, which is the same as that of the positive electrode, and the electrode lead 17 connected to the negative electrode tabs may be made of a copper (Cu) material, which is the same as that of the negative electrode, or a copper material coated with nickel (Ni).

An insulation part 18 may surround a portion of the electrode lead 17. The insulation part 18 may be made of a nonconductor having non-conductivity, which is not electrically conductive. The insulation part 18 may be made using a material that is easily attached to the electrode lead 17 and has a relatively thin thickness. For example, the insulation part 18 may be made of an insulation tape. The material of the insulation part 18 is not limited to the insulation tape, and various members may be used as long as the members are capable of insulating the electrode lead 17.

The insulation part 18 may be disposed between a side 24 of a first case 21 between a side 24 of a second case 22. The pair of sides 24 may be thermally fused to each other. Here, a portion of each of the pair of sides 24 may be thermally fused to the insulation part 18. Thus, the insulation part 18 may insulate the electrode lead 17 from the case 20, and the sealing of the case 20 may be maintained.

The case 20 may provide an accommodation space capable of accommodating the electrode assembly 10, and have a pouch shape as a whole. The case 20 may accommodate and seal the electrode assembly 10 so that a portion of the electrode lead 17 is exposed. The case 20 may include the first case 21 and the second case 22. The first case 21 and the second case 22 may be connected to each other at one side, and portions connected to each other may constituted a folding part. However, an embodiment of the present invention is not limited thereto, and the first case 21 and the second case 22 may be manufactured in various types, for example, a type in which the first case 21 and the second case 22 are separated from each other and individually manufactured.

A cup part 23 capable of accommodating the electrode assembly 10 may be provided in at least one of the first case 21 or the second case 22. Hereinafter, an example is described in which the cup part 23 is provided in each of the first case 21 and the second case 22. An embodiment, in which the cup part 23 is provided only in either of the first case 21 or the second case 22, could be also easily understood by those skilled in the art.

Each of the first case 21 and the second case 22 may include the cup part 23 that accommodates the electrode assembly 10, and the side 24 disposed around the cup part 23. The side 24 may be called a terrace as well.

The cup part 23 of the first case 21 and the cup part 23 of the second case 22 may be communicated with each other to define the accommodation space in which the electrode assembly 10 is accommodated. The side 24 of the first case 21 and the side 24 of the second case 22 may be sealed to each other. Accordingly, the electrode assembly 10 may be sealed in the case 20.

The plurality of electrode tabs 15 may be welded to each other as described above, and such welding may be called pre-welding. The electrode lead 17 may be welded to the plurality of electrode tabs 15, and such welding may be called main-welding.

At least one of the pre-welding or the main-welding may be performed by laser welding during the manufacture of the electrode assembly 10 according to an embodiment of the present invention.

Hereinafter, a welding device 30 that performed such laser welding will be described with reference to FIG. 3. FIG. 3 illustrates that the welding device 30 performs the main-welding, based on which it could be easily understood by those skilled in the art that the welding device 30 performs the pre-welding.

The welding device 30 may include a jig 40, which allows a plurality of objects to be in close contact with each other, and a laser irradiation part 50 which irradiates the plurality of objects with laser. In the pre-welding, the plurality of objects may be the plurality of electrode tabs 15. In the main-welding, the plurality of objects may be the plurality of electrode tabs 15 and the electrode lead 17.

The jig 40 may include a lower jig 41 and an upper jig 42 that face each other with the plurality of objects therebetween. At least one of the lower jig 41 or the upper jig 42 may be elevatably configured. Accordingly, the lower jig 41 and the upper jig 42 may press the plurality of objects from both sides to allow the plurality of objects to be in close contact with each other and fixed.

The jig 40, particularly the upper jig 42, may be a mask jig, and may have a hollow defined therein, through which the laser emitted from the laser irradiation part 50 passes. The hollow may be defined to pass through the upper jig 42 from a top surface to a bottom surface, and face a weld portion of one object (e.g., electrode lead 17). Thus, the laser welding may be smoothly performed through the hollow in a state in which the jig 40 fixes the plurality of objects.

The laser irradiation part 50 may be disposed above the jig 40, particularly the upper jig 42. The laser irradiation part 50 may include a light source and an optical system that converts a path of laser emitted from the light source, and the detailed configuration may be changed as necessary.

The laser irradiation part 50 may emit the laser in the state in which the plurality of objects are in close contact with each other and fixed by the jig 40. The laser emitted from the laser irradiation part 50 may pass through the hollow of the upper jig 42 and be emitted onto one object (e.g., electrode lead 17), and the plurality of objects may be welded to each other.

Figure 4:
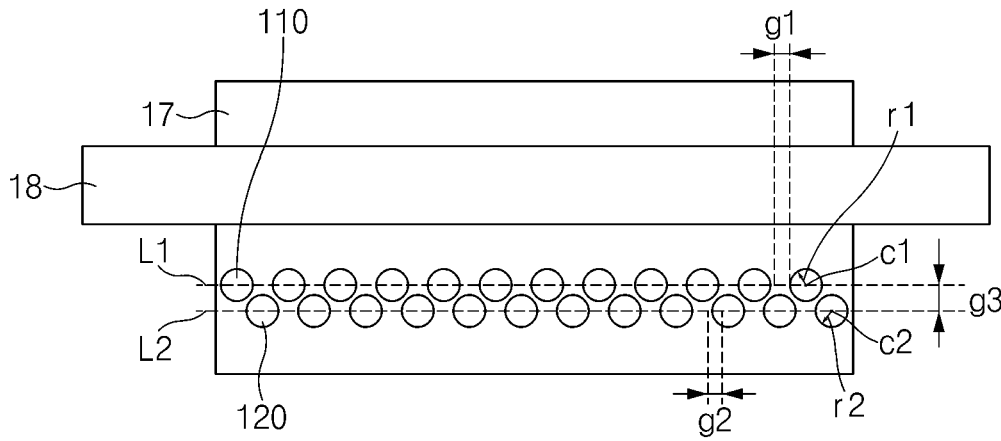
FIG. 4 is an enlarged plan view illustrating a plurality of welded spots formed in an electrode assembly according to an embodiment of the present invention.
Figure 4:
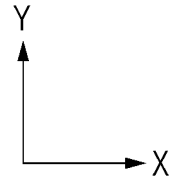

FIG. 4 is an enlarged plan view illustrating a plurality of welded spots formed in an electrode assembly according to an embodiment of the present invention.

During the manufacture of an electrode assembly 10 according to an embodiment of the present invention, at least one of the pre-welding or the main-welding may be performed by laser spot welding, more specifically multi-spot laser welding. Thus, a plurality of welded spots 100 that are marks melted by laser may be formed in a plurality of objects.

Hereinafter, an example is described in which the main-welding is performed by the multi-spot laser welding and an electrode lead 17 includes the plurality of welded spots 100. It could be easily understood by those skilled in the art that when the pre-welding is performed by the multi-spot laser welding, an electrode tab 15 includes the plurality of welded spots 100.

The plurality of welded spots 100 may be formed in a region that non-interferes with a jig 40 of the welding device (see FIG. 3). In more detail, the plurality of welded spots 100 may be formed in a region that faces a hollow which is defined in the jig 40 and through which laser passes.

The plurality of welded spots 100 may include a plurality of first welded spots 110 formed in a first direction (e.g., a direction parallel to an X axis), and a plurality of second welded spots 120 formed in the first direction and misaligned with the plurality of first welded spots 110 in a second direction (e.g., a direction parallel to a Y axis) perpendicularly crossing the first direction. Here, the first direction and the second direction perpendicularly crossing each other is not limited to 90 degrees as academic meaning, and may mean including a manufacturing tolerance.

The first direction may be parallel to a width direction of each of the electrode tab 15 and the electrode lead 17. The second direction may be parallel to a longitudinal direction of each of the electrode tab 15 and the electrode lead 17.

The plurality of welded spots 100 may form a plurality of rows in the first direction, and the rows adjacent to each other may be misaligned with each other in the second direction. The plurality of welded spots 100 may further include a plurality of welded spots, which form an additional row, in addition to the plurality of first welded spots 110 and the plurality of second welded spots 120.

The first welded spots 110 and the second welded spots 120 may be misaligned with each other. In more detail, each of the first welded spots 110 and each of the second welded spots 120 may be alternately disposed in the first direction. Thus, a line sequentially connecting the first welded spot 110 and the second welded spot 120, which are adjacent to each other, may have a shape, in which the letters "W" are sequentially connected to each other, or a zigzag shape. That is, the plurality of welded measurement in Embodiment are greater when compared to Comparative Example. Accordingly, when the plurality of welded spots 100 form spots 100 may have a "W" pattern or a zigzag pattern.

The plurality of first welded spots 110 and the plurality of second welded spots 120 may be formed apart from each other. The first welded spot 110 and the second welded spot 120 may be formed to non-overlap each other. Accordingly, high welding quality may be maintained.

Each of the welded spots 100 may have a substantially circular shape, and a center and a diameter may be defined therein. When the welded spot 100 has a non-circular shape, the center and the diameter of a circle circumscribed around the welded spot 100 may be defined as the center and the diameter of the welded spot 100, respectively.

The diameter of each of the welded spots 100 may be changed according to the material of the objects. For example, the welded spot 100 formed when welding a positive electrode tab and a positive electrode lead, each of which has an aluminum material, may have a diameter of about 1 mm (a radius of about 0.5 mm). The welded spot 100 formed when welding a negative electrode tab and a negative electrode lead, each of which has a copper material, may have a diameter of about 0.5 mm (a radius of about 0.25 mm).

A radius r1 of the first welded spot 110 and a radius r2 of the second welded spot 120 may be the same as or similar to each other. However, an embodiment of the present invention is not limited thereto, and the radiuses may be different from each other as necessary.

Each of the plurality of first welded spots 110 may have a center c1 that is disposed on a first virtual line L1 extending in the first direction. Each of the plurality of second welded spots 120 may have a center c2 that is disposed on a second virtual line L2 parallel to the first virtual line L1.

A gap g3 between the center c1 of the first welded spot 110 and the center c2 of the second welded spot 120 in the second direction may be greater than or equal to the radius r1 of the first welded spot 110 and the radius r2 of the second welded spot 120. The gap g3 between the center c1 of the first welded spot 110 and the center c2 of the second welded spot 120 in the second direction may mean a gap between the first virtual line L1 and the second virtual line L2 in the second direction.

When the gap g3 is less than the radius r1 of the first welded spot 110 or less than the radius r2 of the second welded spot 120, the first welded spot 110 and the second welded spot 120 may partially overlap each other and the welding quality may be deteriorated.

In this embodiment, the second welded spot 120 may be formed to partially overlap the first welded spot 110 in the first direction. That is, the gap g3 may be less than the sum of the radius r1 of the first welded spot 110 and the radius r2 of the second welded spot 120. Thus, as the weld portion of the object may be formed small, the size of each of the electrode tab 15 and the electrode lead 17 may be reduced, and energy densities of the electrode assembly 10 and a secondary battery including the same may increase or electrical capacity may increase.

A gap g1 between the plurality of first welded spots 110 in the first direction may be greater than or equal to the radius r1 of the first welded spot 110. A gap g2 between the plurality of second welded spots 120 in the first direction may be greater than or equal to the radius r2 of the second welded spot 120.

The gap g1 between the plurality of first welded spots 110 in the first direction may be less than or equal to a value of about 1 mm plus the diameter (2*r1) of the first welded spot 110. The gap g2 between the plurality of second welded spots 120 in the first direction may be less than or equal to a value of about 1 mm plus the diameter (2*r2) of the second welded spot 120.

For example, when the objects are a positive electrode tab and a positive electrode lead, each of which has an aluminum material, each of the gaps g1 and g2 may be about 0.5 mm to about 2 mm. When the objects are a negative electrode tab and a negative electrode lead, each of which has a copper material, the gap g3 may be about 0.25 mm to about 1.5 mm.

Accordingly, the plurality of welded spots 100 may be reliably prevented from being formed to partially overlap each other in the first direction during the welding, thereby preventing weld strength from being excessively reduced while maintaining the high welding quality.

Figure 5:
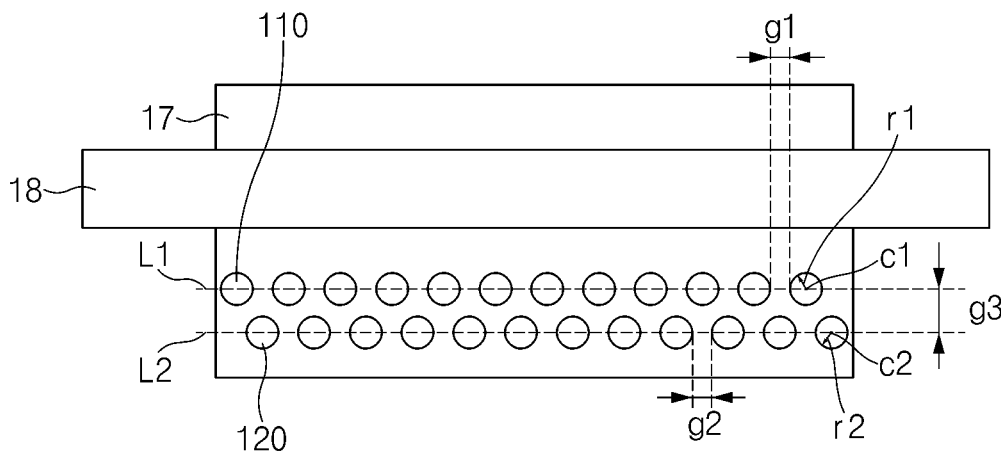
FIG. 5 is a plan view illustrating a plurality of welded spots formed in an electrode assembly according to another embodiment of the present invention.
Figure 5:
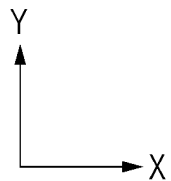

FIG. 5 is a plan view illustrating a plurality of welded spots formed in an electrode assembly according to another embodiment of the present invention.

Hereinafter, the content in common with the content described above will be omitted and the description will be focused on differences.

In an electrode assembly 10 according to this embodiment, a second welded spot 120 may be formed to non-overlap a first welded spot 110 in the first direction. That is, a gap g3 between a center c1 of the first welded spot 110 and a center c2 of the second welded spot 120 in the second direction may be greater than or equal to the sum of a radius r1 of the first welded spot 110 and a radius r2 of the second welded spot 120.

The gap g3 may be less than or equal to a value of about 1 mm plus the sum of the radius r1 of the first welded spot 110 and the radius r2 of the second welded spot 120. Thus, a concern that the first welded spot 110 and the second welded spot 120 are likely to overlap each other may be reduced, and also a weld portion may be prevented from excessively increasing.

For example, when objects are a positive electrode tab and a positive electrode lead, each of which has an aluminum material, the gap g3 may be about 1 mm to about 2 mm. When the objects are a negative electrode tab and a negative electrode lead, each of which has a copper material, the gap g3 may be about 0.5 mm to about 1.5 mm.

Tests were performed by comparing Embodiment according to the present invention, in which a plurality of welded spots 100 form a "W" pattern or a zigzag pattern, and Comparative Example in which a plurality of welded spots have a predetermined matrix shape as in FIG. 1. The results thereof are shown in Table 1 below.

TABLE 1

| | | Test 1 | Test 2 | Test 3 | Test 4 | Test 5 | Average |
|---|---|---|---|---|---|---|---|
| Comparative Example | Tensile strength (kgf) | 105.8 | 104.2 | 103.4 | 105.2 | 100.2 | 103.8 |
| | Final measurement (mm) | 27 | 27 | 32 | 25 | 23 | 26.8 |
| Embodiment | Tensile strength (kgf) | 105.2 | 104.1 | 105.4 | 101.7 | 103.2 | 103.9 |
| | Final measurement (mm) | 35 | 41 | 42 | 43 | 40 | 40.2 |

In the test conditions in Table 1, a gap between a first welded spot 110 and a second welded spot 120 in the second direction is about 0. That is, a gap g3 between a center c1 of the first welded spot 110 and a center c2 of the second welded spot 120 in the second direction corresponds to the sum of a radius r1 of the first welded spot 110 and a radius r2 of the second welded spot 120. The tensile strength was obtained by measuring of the force at which an electrode tab 15 and an electrode lead 17 are separated from each other, and the final measurement was obtained by measuring a length in a width direction of the electrode tab 15 remaining on the electrode lead 17 after the electrode tab 15 and the electrode lead 17 are separated from each other. The final measurement may be a final measurement in a failure mode. Although the reference numerals used in the present invention are used in explaining the test conditions in Table 1, it could be easily understood by those skilled in the art that the same applies to Comparative Example.

As the tensile strength is higher, and as the final measurement in the failure mode is greater, the welding quality between metal sheets, each of which has a thin thickness like the electrode tab 15 or the electrode lead 17, is more excellent. Referring to Table 1, it may be confirmed that the tensile strength and the final measurement in Embodiment are greater when compared to Comparative Example. Accordingly, when the plurality of welded spots 100 form the "W" pattern or the zigzag pattern like the present invention, the welding quality may be more excellent compared to when the plurality of welded spots have the predetermined matrix shape as in FIG. 1.

Figure 6:
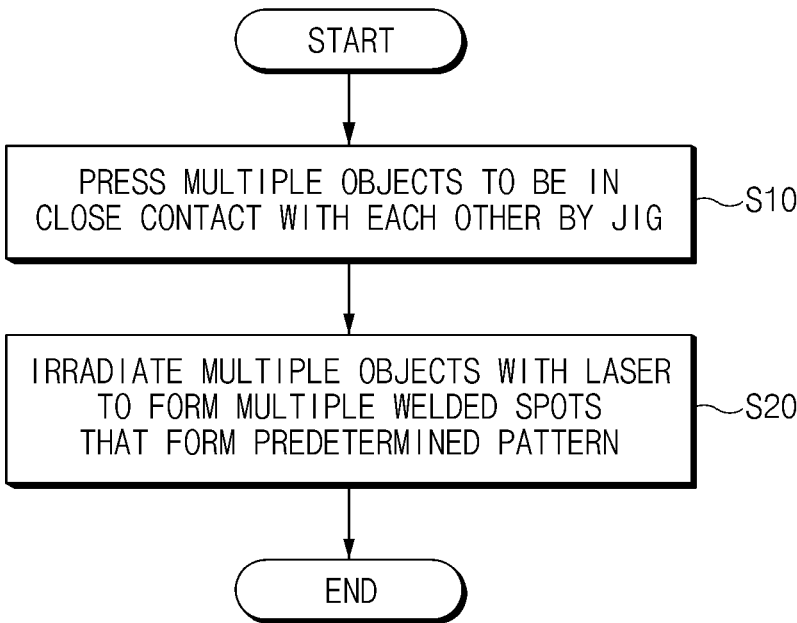
FIG. 6 is a flowchart of a welding method according to still another embodiment of the present invention.

FIG. 6 is a flowchart of a welding method according to still another embodiment of the present invention.

In still another embodiment of the present invention, a welding method is described of welding a plurality of electrode tabs 15 of the electrode assembly 10 described above to each other or welding the plurality of electrode tabs 15 to an electrode lead 17.

The welding method according to this embodiment may include pressing a plurality of objects to be in close contact with each other by the jig 40 (see FIG. 3) (S10), and irradiating the plurality of objects with laser to form a plurality of welded spots 100 (see FIG. 4 or 5) that form a predetermined pattern (S20). The plurality of objects may be the plurality of electrode tabs 15 or may be the plurality of electrode tabs and the electrode lead 17.

In the allowing of the plurality of objects to be in close contact with each other (S10), the jig 40 of a welding device 30 may press the plurality of objects from both sides to be in close contact with each other and fixed.

In the forming of the plurality of welded spots 100 (S20), the laser irradiation part 50 of the welding device 30 may perform multi-spot laser welding by irradiating a weld portion of the objects with the laser through a hollow defined in the jig 40, particularly an upper zig 42. Accordingly, the plurality of welded spots 100 may be formed in the objects.

The plurality of welded spots 100 may include a plurality of first welded spots 110 and a plurality of second welded spots 120 as described above. The contents described above with reference to FIGS. 4 and 5 applies to the detailed configuration of a pattern formed by the plurality of first welded spots 110 and the plurality of second welded spots 120.

Accordingly, the welding quality between the plurality of objects may be improved by the welding method according to the present invention.

According to the preferred embodiments of the present invention, the gap between the plurality of first welded spots and second welded spots may be minimized. Accordingly, as the weld portion of the object may be formed small, the size of each of the electrode tab and the electrode lead may be reduced, and the energy densities of the electrode assembly and the secondary battery including the same may increase or the electrical capacity may increase.

Moreover, the first welded spot and the second welded spot may be prevented from being formed to overlap each other, and the welding quality may be improved.

In addition, the effects may be included which could be easily predicted by those skilled in the art from the configurations according to the preferred embodiments of the present invention.

While the present invention has been shown and described in connection with the exemplary embodiments, it will be apparent to those skilled in the art that modifications and variations can be made without departing from the spirit and scope of the invention as defined by the appended claims.

Therefore, the embodiments set forth herein are to describe the technical spirit of the present invention and not to limit. The scope of the technical spirit of the present invention is not limited by the embodiments.

Moreover, the protective scope of the present invention should be determined by reasonable interpretation of the appended claims and all technical concepts coming within the equivalency range of the present application should be interpreted to be in the scope of the right of the present application.

What is claimed is:

1. An electrode assembly comprising:
a plurality of electrodes stacked with a separator therebetween; and
a plurality of electrode tabs connected to the plurality of electrodes and welded to each other,
wherein each of the electrode tabs comprises
a plurality of first welded spots formed in a first direction, and
a plurality of second welded spots formed in the first direction and misaligned with the plurality of first welded spots in a second direction perpendicular to the first direction,
wherein a first gap between a center of each of the first welded spots and a center of each of the second welded spots in the second direction is greater than or equal to a radius of the first welded spot and a radius of the second welded spot,
wherein a second gap between the plurality of first welded spots in the first direction is greater than or equal to the radius of the first welded spot and less than or equal to a value of about 1 mm plus a diameter of the first welded spot,
wherein a third gap between the plurality of second welded spots in the first direction is greater than or equal to the radius of the second welded spot and less than or equal to a value of about 1 mm plus a diameter of the second welded spot.

2. An electrode assembly comprising:
a plurality of electrodes stacked with a separator therebetween;
a plurality of electrode tabs connected to the plurality of electrodes and welded to each other; and
an electrode lead welded to the plurality of electrode tabs,
wherein the electrode lead comprises
a plurality of first welded spots formed in a first direction, and
a plurality of second welded spots formed in a first direction and misaligned with the plurality of first welded spots in a second direction perpendicular to the first direction, wherein a first gap between a center of each of the first welded spots and a center of each of the second welded spots in the second direction is greater than or equal to a radius of the first welded spot and a radius of the second welded spot,
wherein a second gap between the plurality of first welded spots in the first direction is greater than or equal to the radius of the first welded spot and less than or equal to a value of about 1 mm plus a diameter of the first welded spot,
wherein a third gap between the plurality of second welded spots in the first direction is greater than or equal to the radius of the second welded spot and less than or equal to a value of about 1 mm plus a diameter of the second welded spot.

3. The electrode assembly of claim 1, wherein the plurality of first welded spots and the plurality of second welded spots are spaced apart from each other.

4. The electrode assembly of claim 1, wherein the plurality of first welded spots and the plurality of second welded spots are alternately disposed in the first direction.

5. The electrode assembly of claim 1, wherein the second welded spot partially overlaps the first welded spot in the first direction.

6. The electrode assembly of claim 1, wherein the first gap between the center of the first welded spot and the center of the second welded spot in the second direction is less than or equal to a value of about 1 mm plus a sum of the radius of the first welded spot and the radius of the second welded spot.

7. The electrode assembly of claim 2, wherein the plurality of first welded spots and the plurality of second welded spots are spaced apart from each other.

8. The electrode assembly of claim 2, wherein the plurality of first welded spots and the plurality of second welded spots are alternately disposed in the first direction.

9. The electrode assembly of claim 2, wherein the second welded spot partially overlaps the first welded spot in the first direction.

10. The electrode assembly of claim 2, wherein the first gap between the center of the first welded spot and the center of the second welded spot in the second direction is less than or equal to a value of about 1 mm plus a sum of the radius of the first welded spot and the radius of the second welded spot.

* * * * *